United States Patent
Pedersen et al.

(10) Patent No.: US 9,199,570 B2
(45) Date of Patent: Dec. 1, 2015

(54) TRANSPORTATION OF WIND TURBINE BLADES, IN PARTICULAR ALONG CURVED ROADS

(71) Applicants: Tom Pedersen, Lem (ZA); Jens Thomsen, Brande (DK)

(72) Inventors: Tom Pedersen, Lem (ZA); Jens Thomsen, Brande (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 13/896,413

(22) Filed: May 17, 2013

(65) Prior Publication Data

US 2013/0315685 A1    Nov. 28, 2013

(30) Foreign Application Priority Data

May 22, 2012   (EP) .................................... 12168909

(51) Int. Cl.
| | |
|---|---|
| *B60P 7/08* | (2006.01) |
| *B60P 3/40* | (2006.01) |
| *B60P 7/12* | (2006.01) |
| *F03D 1/00* | (2006.01) |

(52) U.S. Cl.
CPC ... *B60P 3/40* (2013.01); *B60P 7/12* (2013.01); *F03D 1/005* (2013.01); *Y02B 10/30* (2013.01); *Y02E 10/72* (2013.01)

(58) Field of Classification Search
CPC .............. B60P 3/40; B60P 7/12; F03D 1/005; Y02B 10/30; Y02E 10/72
USPC .......... 410/34, 44, 45, 53, 120, 155; 280/404; 414/460
See application file for complete search history.

(56) References Cited

U.S. PATENT DOCUMENTS

| | | | | |
|---|---|---|---|---|
| 7,744,318 | B2 * | 6/2010 | Wobben | 410/45 |
| 7,775,753 | B2 * | 8/2010 | Pedersen | 410/44 |
| 2006/0285937 | A1 | 12/2006 | Wobben | |
| 2011/0142589 | A1 | 6/2011 | Thoren | |

FOREIGN PATENT DOCUMENTS

| | | |
|---|---|---|
| CN | 1863719 A | 11/2006 |
| CN | 102079265 A | 6/2011 |
| CN | 102123886 A | 7/2011 |
| CN | 102416895 A | 4/2012 |
| DE | 202009012068 U1 | 2/2010 |
| EP | 1465789 B1 | 4/2008 |
| EP | 1659026 B1 | 8/2008 |
| EP | 1644271 B1 | 10/2009 |
| KR | 20090113546 A | 11/2009 |
| WO | WO 2006000230 A1 | 1/2006 |
| WO | WO 2010020297 A1 | 2/2010 |

* cited by examiner

*Primary Examiner* — Stephen Gordon

(57) ABSTRACT

A system for supporting a blade for a wind turbine, in particular a wind turbine blade having a curved portion is described. The system includes a first support arrangement with (a) a root support element adapted to support a root portion of the blade such that the root portion is rotatable about a longitudinal axis of the blade, and (b) a root elevation element adapted to adjust a vertical position of the root support element. Further, a transport vehicle for transporting a blade for a wind turbine is provided. The transport vehicle includes (a) a front platform, (b) a rear platform, and (c) a system as described above, wherein the first support arrangement is mounted at the front platform and the second support arrangement is mounted at the rear platform. Furthermore, a method of transporting a wind turbine blade having a curved portion is described.

14 Claims, 6 Drawing Sheets

FIG 7B

TRANSPORTATION OF WIND TURBINE BLADES, IN PARTICULAR ALONG CURVED ROADS

CROSS REFERENCE TO RELATED APPLICATIONS

The present application claims priority to European Patent Office Application No. 12168909.5 EP filed May 22, 2012, the entire content of which is hereby incorporated by reference.

FIELD OF INVENTION

The present invention relates to the field of transportation of wind turbine blades, in particular wind turbine blades having a curved portion.

ART BACKGROUND

Transportation of wind turbine blades or similar objects is a difficult task for a number of reasons. When such objects are transported along roads by means of suitable vehicles, the significant length of the objects and the fact that many blades contain a curved end or tip part may cause the blades to interfere with bridges, trees, buildings and similar obstacles along the route of transportation, in particular when traveling along curved roads and in roundabouts.

From EP 1 644 271 B1 it is known to stretch a curved blade by different means during transportation.

From EP 1 659 026 B1 it is known to pivot a blade from a horizontal position to an inclined position during transportation and to change the distance between ends of supporting means of the blade when the blade is pivoted.

From EP 1 465 789 B1 it is known to rotate a blade 90° about its own axis prior to transporting the blade under a bridge. Thereby, collision between the bridge and the blade can be prevented at the expense that horizontal dimension of the transport increases during transportation under the bridge.

SUMMARY OF THE INVENTION

There may be a need for an improved way of transporting large elongate objects like wind turbine blades.

This need may be met by the subject matter according to the independent claims. Advantageous embodiments of the present invention are described by the dependent claims.

According to a first aspect of the invention, there is provided a system for supporting a blade for a wind turbine, in particular a wind turbine blade having a curved portion. The described system comprises a first support arrangement comprising (a) a root support element adapted to support a root portion of the blade such that the root portion is rotatable about a longitudinal axis of the blade, and (b) a root elevation element adapted to adjust a vertical position of the root support element.

This aspect of the invention is based on the idea that by supporting the root portion of a blade such that it is rotatable about a longitudinal axis of the blade, the blade may be rotated a certain amount such that a curved portion of the blade follows a particular curve of the transportation road. Thereby, interference with houses or other obstacles along the transportation road can be prevented.

In the present context, the notion "rotation about a longitudinal axis of the blade" is to be understood as a rotation about an axis extending in the length direction of the blade.

The term "root portion of the blade" denotes the end of the blade which is intended for being mounted at a rotor of a wind turbine.

The curved portion of the blade is preferably located at or close to a tip end of the blade, i.e. at the end of the blade opposite to the root portion.

The root support element is designed to support and hold the root portion of a wind turbine blade. The root support allows rotation of the blade while the blade is supported by the root support element.

The rotation of the blade adjusts the direction of the tip end or curved portion of the blade. Thereby, by rotating the root portion of the blade (and thereby the entire blade) by means of the root support element, the direction of the tip end portion of the blade can be adjusted in such a way that the projection of the blade onto the horizontal plane (or the plane of a road for transportation) fits the curvature of the road for transportation. Accordingly, it can be prevented that the tip end of the blade interferes with houses or other objects along the side of the road for transportation.

The root support element may further comprise a locking mechanism for securing the blade root (and thereby the entire blade) in a desired position after rotation of the root portion.

The root elevation element is operable to adjust the vertical position of the root support element. In other words, the root elevation element is capable of moving the root support element—and thereby also the root portion of a blade supported by the root support element—up and down. By elevating the root portion of the blade to a certain vertical level, rotation of the blade can be facilitated. More specifically, wind turbine blades are often broader, i.e. have a larger cross-sectional area, at one or more positions along the blade which position(s) is/are located a certain distance away from the root of the blade. Accordingly, by raising the root portion, it can be prevented that such a broader portion of the blade interferes with or is blocked by e.g. the underground or a platform of a transport vehicle.

According to a further embodiment of the invention, the first support arrangement further comprises a root support frame adapted to be detachably mounted at a platform of a transporting vehicle, and the root support element and the elevation element are mounted at the root support frame.

The root support frame is preferably made from a strong and rigid material, such as steel, and may be equipped with suitable means, such as a loop or eye for engaging with a strapping tool, a container lock or similar fastening equipment known from e.g. the container transport industry.

The root support frame makes it possible to mount and demount the root support arrangement at a standard platform of a transporting vehicle. Accordingly, expensive design and fabrication of special platforms can be avoided.

According to a further embodiment of the invention, the root support element and/or the root elevation element is/are pivotally mounted at the root support frame, such as to be pivotal about an axis perpendicular to the longitudinal axis of at least a section of the blade, which section includes the root portion.

The pivotal axis is perpendicular to an axis parallel to the length direction of the blade (at the root portion). This means that when a blade is supported by the root support element, the blade may pivot vertically, e.g. if the tip end of the blade is raised or lowered, and/or horizontally, i.e. from side to side relative to a direction of transportation.

The pivotal mounting of the root support element and/or the root elevation element provides further flexibility to the possibility of adjusting the orientation of the blade during transport such as to avoid interference with obstacles (e.g.

houses, trees or bridges). In particular, vertical pivoting may be beneficial when transporting a blade through regions with mountains or hills.

According to a further embodiment of the invention, the root support element is adapted to rotate the root portion of the blade 360° around the longitudinal axis of the blade.

The root support element is preferably capable of allowing rotation to any given angle or to a predetermined number of discrete angles. In both cases, the angle is measured relative to a given reference angle. For example, the angle where the tip is pointing vertically upwards may be referred to as 0°. The discrete angles may be separated by angular intervals of e.g. 1°, 2°, 5°, 10°, 15°, 30° or 45°, or any other suitable values.

Thereby, a high degree of flexibility is provided such that a large variety of road curvature and/or slope can be successfully dealt with.

According to a further embodiment of the invention, the root support element comprises at least one of a bearing, a toothed wheel, a toothed ring, and a motor/gear actuator.

Any of these elements may serve to allow for precise adjustment of the rotation of the root portion of the blade. In particular, a (used or new) toothed wheel designed for mounting the blade at a rotor of a wind turbine may be used, thereby reducing the number of parts that have to be specially manufactured for the first support arrangement.

According to a further embodiment of the invention, the root elevation element comprises a hydraulic cylinder, a scissor lift, a spindle drive, an actuator and/or a toothed bar.

The hydraulic cylinder, scissor lift, spindle drive, actuator and/or toothed bar may be manually operable or they may be equipped with electronic controls which allow selection of pre-programmed vertical positions.

According to a further embodiment of the invention, the system further comprises a second support arrangement for supporting a portion of the blade at a position along the blade, the second support arrangement comprising (a) a disc element adapted to circumferentially surround the blade at the position along the blade, and (b) a support cradle adapted to receive and support the disc element such that the disc element is rotatable within the support cradle when the root portion of the blade is rotated.

In the present context, "a portion of the blade at a position along the blade" refers to a portion of the blade which is located at a position between the root of the blade and the tip of the blade.

The disc element is shaped to surround the circumference of the blade at the position along the blade. In other words, the disc element has an opening which is shaped to fit snuggly to the cross-sectional shape of the blade at the position along the blade.

The support cradle is shaped such that the outer surface of the disc element fits therein. Accordingly, the portion of the blade may be supported by the support cradle via the disc element surrounding the blade portion. The inner surface of the support cradle is shaped such that the disc element can rotate (about the longitudinal axis of the blade portion, i.e. about the length direction of the blade) while being supported by the cradle. Thereby, the blade portion is able to rotate when the root portion of the blade is rotated by the root support element. In other words, the entire blade is allowed to rotate a full 360° with the root portion of the blade.

In some cases, it may be convenient to fit individual disc elements at predetermined positions along the blade. Thereby, the support cradle may be positioned at a selected one of these predetermined positions and the corresponding disc element may be placed in the support cradle.

According to a further embodiment of the invention, the disc element comprises an inner part made from polystyrene or similar light-weight material and an outer part made from nylon or a similar low-friction material.

In the present context, the "inner part" of the disc element denotes the part of the disc element which is designed to be closest to the blade, whereas the "outer part" of the disc element denotes the outer boundary (in the radial direction, i.e. perpendicular to the longitudinal axis of the blade) of the disc element which is supposed to be in contact with the support cradle.

Apart from being a light-weight material, polystyrene can be easily shaped to the cross-sectional shape of the blade.

By forming the outer part of the disc element from nylon, which is a relatively cheap material which is able to provide a very smooth surface, i.e. a surface with low friction, the disc element can easily slide (i.e. rotate) within the support cradle when the root portion of the blade is rotated at the root support element. An auxiliary mechanism may be used to assist the rotation, e.g. a drive wheel, a motor or similar.

According to a further embodiment of the invention, the support cradle is adapted to be detachably mounted at a platform of a transport vehicle.

The support is mounted to or equipped with suitable means, such as a loop or eye for engaging with a strapping tool, a container lock or similar fastening means, for being detachably mounted at a transport vehicle platform.

Thereby, it is possible to mount and demount the support cradle at a standard platform of a transporting vehicle, such that expensive design and fabrication of special platforms can be avoided.

According to a further embodiment of the invention, the second support arrangement further comprises a support elevation element adapted to adjust a vertical position of the support cradle.

By raising or lowering the vertical position of the support cradle, a blade can be tilted in the sense that the vertical position of the rear end (or tip portion) of the blade is correspondingly raised or lowered. By raising the rear end of the blade, interference with trees or buildings along the roadside may be avoided.

The support elevations element may e.g. comprise a scissor lift driven by one or more hydraulic or pneumatic cylinders. The scissor lift is preferably arranged between the transport vehicle platform and the support cradle.

According to a second aspect of the invention, there is provided a transport vehicle for transporting a blade for a wind turbine, in particular a blade having a curved portion. The described transport vehicle comprises (a) a front platform, (b) a rear platform, and (c) a system according to the first aspect or any of the above embodiments. The first support arrangement is mounted at the front platform, and the second support arrangement is mounted at the rear platform.

This aspect of the invention is based on the idea that by supporting the root portion and a further portion of a blade such that the blade is rotatable about its own longitudinal axis, the blade may be rotated a certain amount such that a curved portion of the blade follows a particular curve of the transportation road. Thereby, interference with houses or other obstacles along the transportation road can be prevented.

The front platform may be a standard platform for a transport vehicle. Similarly, the second platform may also be a standard platform for a transport vehicle. The first and second platforms may be connected to or independent of each other.

According to a further embodiment of the invention, a distance between the front platform and the rear platform is adjustable.

The distance between the front platform and the rear platform may preferably be adjustable by a hydraulic connection between the front platform and the rear platform.

By reducing the distance between the platforms, adjustment of the vertical position or elevation of the support cradle above the second platform, will have a larger impact on the vertical position of the tip end of the blade as compared to a relatively long distance between the platforms.

According to a third aspect of the invention, there is provided a method of transporting a wind turbine blade having a curved portion. The described method comprises (a) supporting a root portion of the wind turbine blade, (b) supporting a further portion of the wind turbine blade at a position along the blade, and (c) rotating the blade about a longitudinal axis of the blade such that the curved portion of the blade fits a curved part of a transport route.

This aspect of the invention is based on the idea that by supporting the root portion and a further portion of a blade and rotating the blade a certain amount about a longitudinal axis of the blade, it can be achieved that a curved portion of the blade follows a particular curve of the transportation road. Thereby, interference with houses or other obstacles along the transportation road can be prevented.

The rotation of the blade may be performed manually by operating a root support element directly or by use of remote controls located e.g. in the control cabin of a transporting vehicle.

According to a further embodiment of the invention, the described method further comprises elevating the further portion of the blade.

The elevation of the further portion of the blade may be performed manually by operating a second support arrangement element directly or by use of remote controls located e.g. in the control cabin of a transporting vehicle.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular combinations of features of the method type claims and features of the apparatus type claims, is part of the disclosure of this document.

The aspects defined above and further aspects of the present invention are apparent from the examples of embodiment to be described hereinafter and are explained with reference to the examples of embodiment. The invention will be described in more detail hereinafter with reference to examples of embodiment to which, however, the invention is not limited.

DETAILED DESCRIPTION

The illustration in the drawing is schematically. It is noted that in different figures, similar or identical elements are provided with the same reference signs or with reference signs, which are different from the corresponding reference signs only within the first digit.

Figure 1:
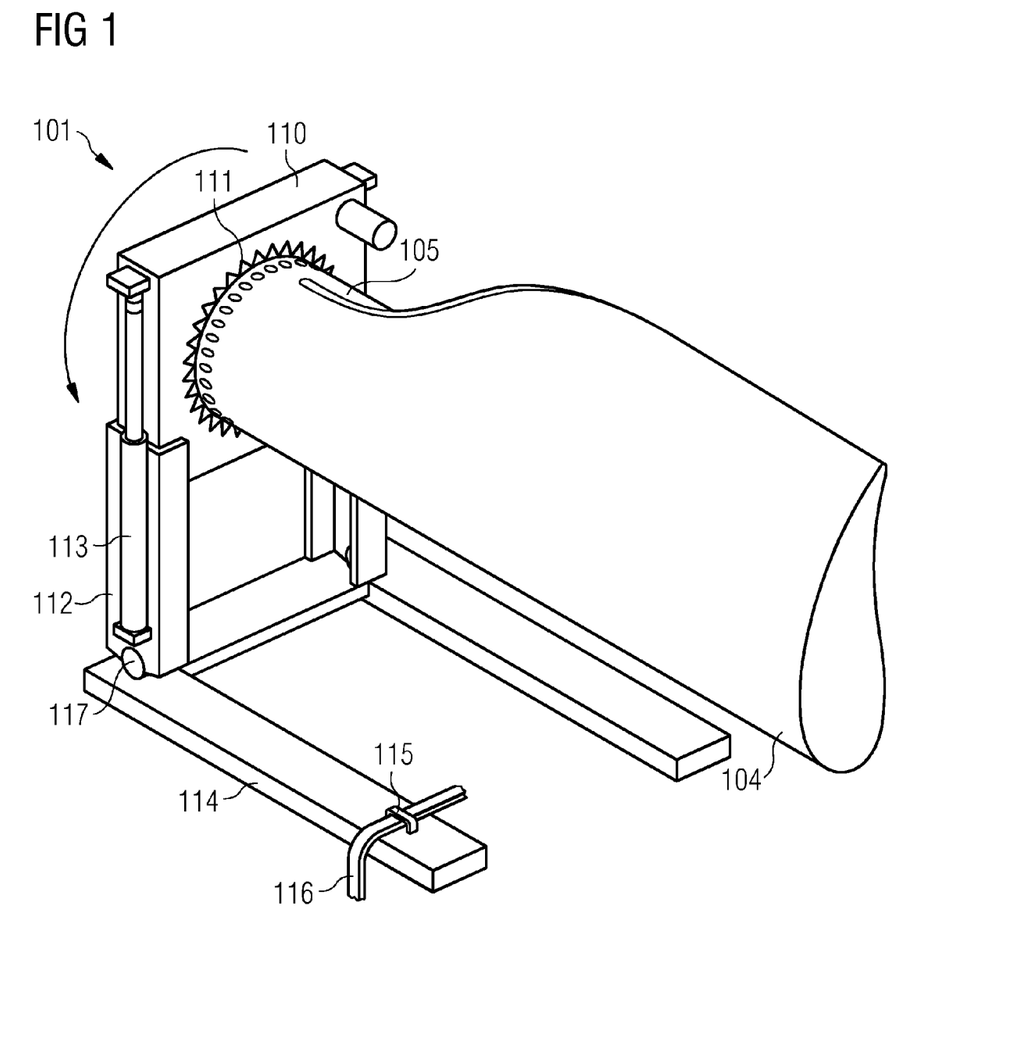
FIG. 1 shows a first (root portion) support arrangement according to an embodiment.

FIG. 1 shows a first support arrangement 101 according to an embodiment for supporting a root portion 105 of a wind turbine blade 104.

The first support arrangement 101 comprises a root support element 110 for supporting the root portion 105 of the blade 104 in a rotational manner, i.e. such that the root portion 105 is rotatable about the longitudinal axis of the blade 104 at the root portion 105 as indicated by the arrow. In the present embodiment, the rotational support is provided by a toothed wheel (yaw gear) 111 which, after releasing a locking mechanism (not shown) allows adjustment of the rotational angle of the blade root portion 105. The number of possible rotational positions is dependent on the toothed wheel 111.

The first support arrangement 101 further comprises a root elevation element 112 for adjusting the vertical position of the root support element 110 and, thereby, of the root portion 105 of the blade 104. The root elevation element 112 comprises hydraulic cylinders 113. The root elevation element 112 is pivotally connected to a root support frame 114 by hinge 117. The hinge 117 allows the root elevation element 112 and the root support element 110 to pivot about a horizontal axis perpendicular to the longitudinal axis of the blade 104. Thereby, the support arrangement 101 allows a supported blade 104 to be inclined, i.e. if a lifting force is applied to another part of the blade 104.

The root support frame 114 has a substantial U-shape formed by bar-like elements. The root support frame 114 comprises loops 115 which allow fastening of the root support frame 114 to a platform of a transporting vehicle by using straps 116.

Figure 2:
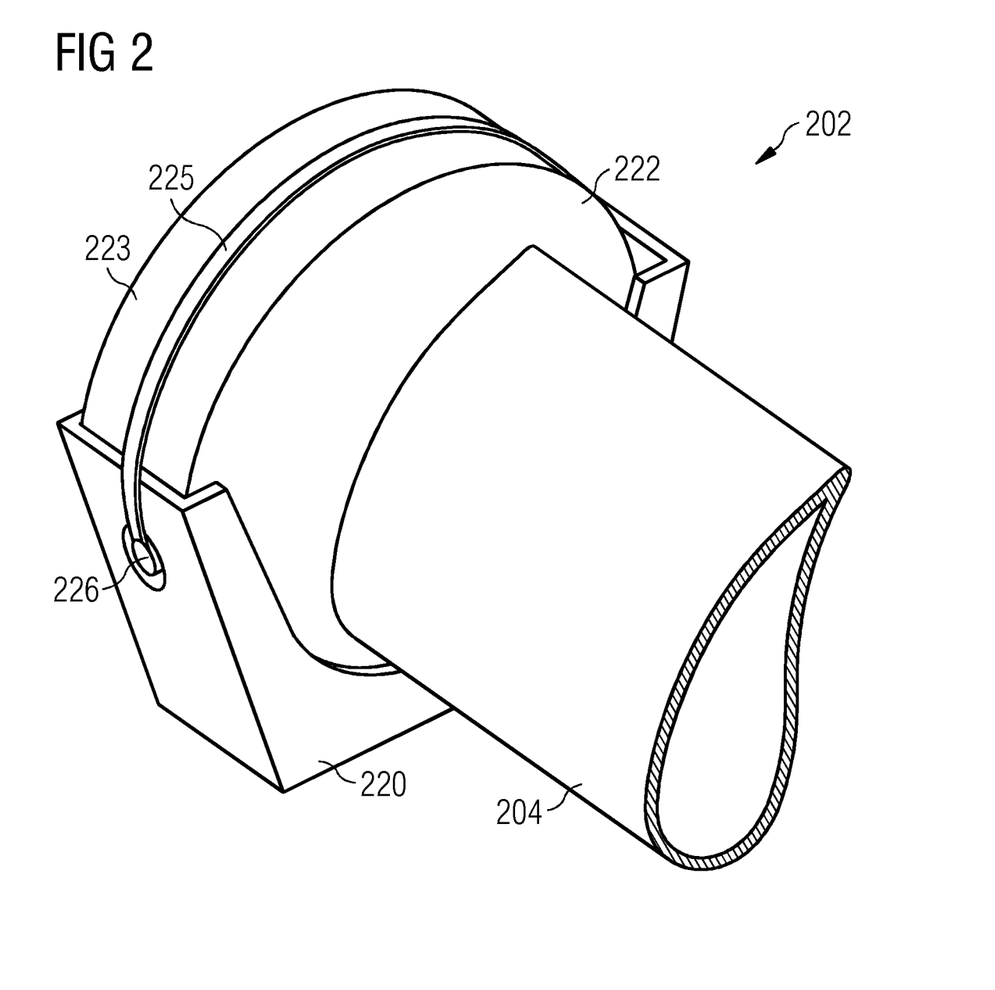
FIG. 2 shows a second (blade portion) support arrangement according to an embodiment.

FIG. 2 shows a second support arrangement 202 according to an embodiment for supporting another portion (i.e., other than the root portion 105) of a wind turbine blade 204.

The second support arrangement 202 comprises a disc element 222 designed to surround the circumference of the blade 204. The second support arrangement 202 further comprises a support cradle 220 shaped to receive and support the disc element 222. The support cradle is preferably open in the upwards direction towards the blade 204 (as shown in the drawing) such that the disc element 222 fitted around the blade 204 may be arranged in the support cradle 220 in a very simple manner.

The disc element 222 comprises a smooth (low-friction) outer surface 223 which may be covered with nylon or a similar material. Thereby, the outer surface 223 is able to run smoothly within the support cradle 220 such that the blade 204 may be easily rotated. When the blade 204 is in its intended rotational position and further rotation of the blade 204 is accordingly not desired, the disc element 222 may be fixed by means of a strap 225 which may be fastened at a strap lock 226 and drawn over the upper part of the disc outer surface 223 and fixed on a corresponding strap lock (not shown) at the opposite side of the support cradle. The support cradle 220 is preferably equipped with a mechanism (not shown) for detachably fastening it at a standard platform of a transport vehicle.

Figure 3A:
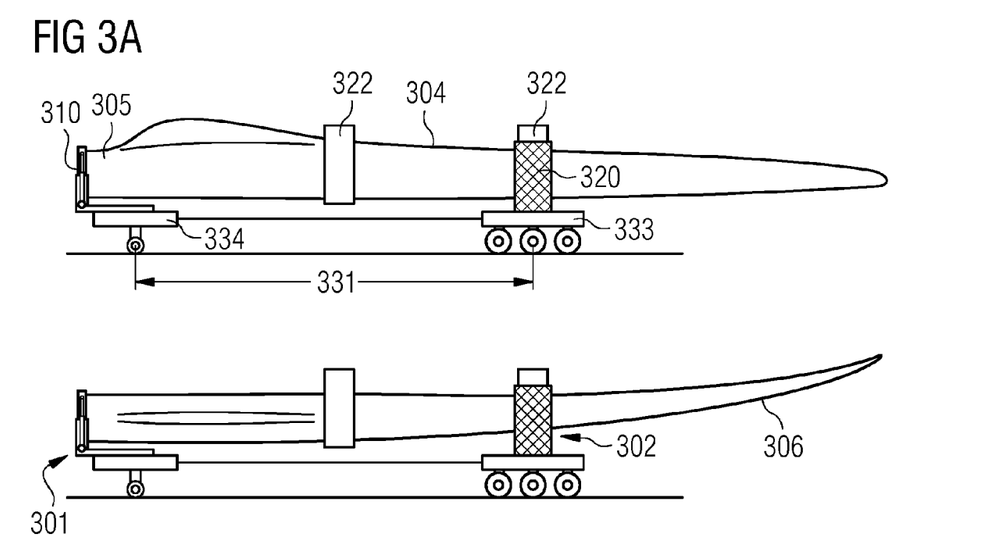
FIG. 3A shows a blade supported by a first configuration of an embodiment.

FIG. 3A shows a blade 304 supported by a first support arrangement 301 and a second support arrangement 302 in accordance with an embodiment. The upper and lower drawings in FIG. 3A differ from each other only in the rotational position of the blade 304. More specifically, in the lower drawing, a curved portion 306 of the blade is visible, whereas this curved portion 306 is not visible in the upper drawing. The root portion 305 of the blade 304 is supported by root support element 310 which is arranged on a front trailer 334. Along the blade 304, two disc elements 322 are arranged. The rear (rightmost in the drawing) disc element 322 is arranged in support cradle 320 which is arranged on a rear trailer 333. The rear trailer 333 is separated a long distance 331 from the front trailer 334.

Figure 3B:
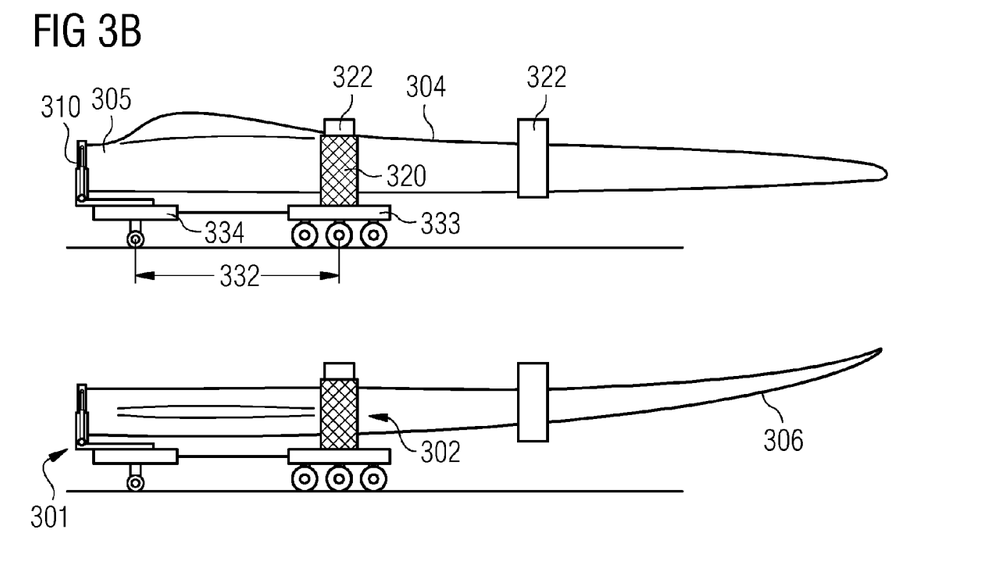
FIG. 3B shows a blade supported by a second configuration of an embodiment.

FIG. 3B shows the same views as FIG. 3A with the only difference that the rear trailer 333 is separated a short distance 332 from the front trailer 334 and that the front (leftmost in the drawing) disc element 322 is arranged in the support cradle 320.

Figure 4:
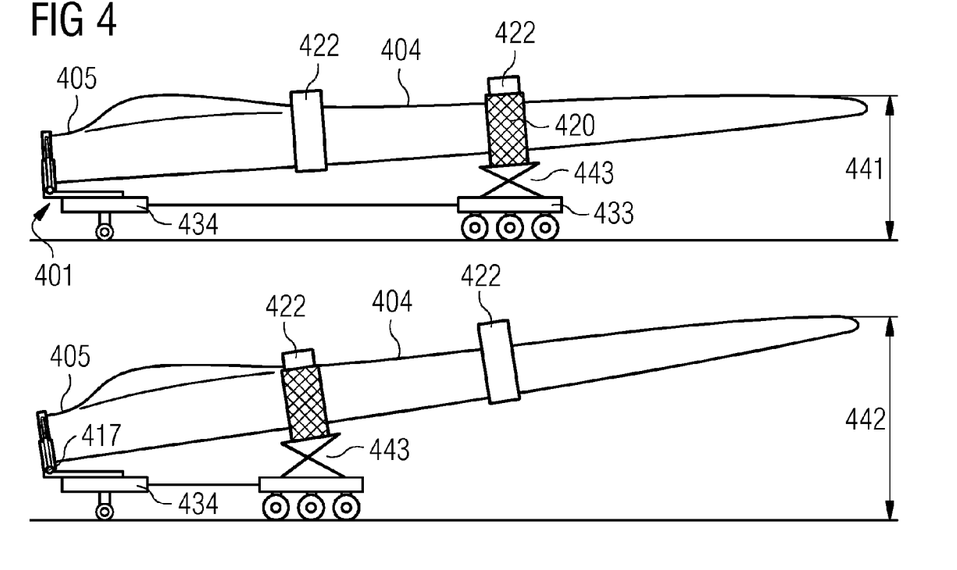
FIG. 4 shows a tilted blade supported by two configurations of an embodiment.

FIG. 4 shows similar views as FIGS. 3A and 3B with the addition that support cradle 420 can be elevated by support elevation element 443 arranged on the rear trailer 433. In the upper view of FIG. 4, the rear (rightmost in the drawing) disc element 422 is arranged in the support cradle 420 and the rear trailer is positioned at the long distance from the front trailer 434 on which the first support arrangement 401 is mounted. Thereby, the blade 404 is pivoted about the axis of the hinge 417 and the tip of the blade 404 is elevated a relatively small amount 441 above ground level. In the lower drawing, the rear trailer 443 is positioned at the short distance from the front trailer 434 and the front (leftmost in the drawing) disc element 422 is arranged in the support cradle 420. Due to the shorter distance between the front trailer 434 and the rear trailer 433, the elevation of the tip of the blade 404 is increased to height 442 above ground level in comparison to the upper drawing of FIG. 4.

Accordingly, even if the support elevation element 443 has a limited elevation range, the impact on the elevation of the tip portion of the blade 404 can be increased by reducing the distance between the front trailer 434 and the rear trailer 433.

Figure 5A:
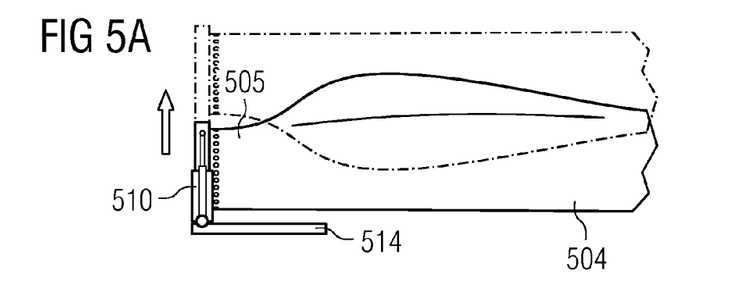
FIG. 5A shows a side view of a blade root portion supported by a support arrangement according to an embodiment.

FIG. 5A shows a side view of a blade root portion 505 supported by a support arrangement according to an embodiment. More specifically, the solid line indicates one rotational position (0°) of the blade 504 while the dashed line indicates another rotational position of the blade 504, in which the blade has been rotated 180°. In order to make this rotation possible without the blade interfering with e.g. the root support frame 514, the root elevation element 512 has been operated to raise the root support element 510 a corresponding amount.

Figure 5B:
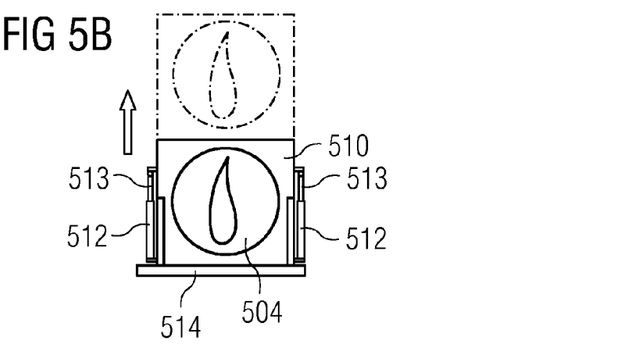
FIG. 5B shows a front view of the embodiment shown in FIG. 5A.

FIG. 5B shows a front view of the embodiment and configurations shown in FIG. 5A. Again, it can be seen that the hydraulic cylinders 513 have been operated to raise the root support element 510 (dashed line).

Figure 6A:
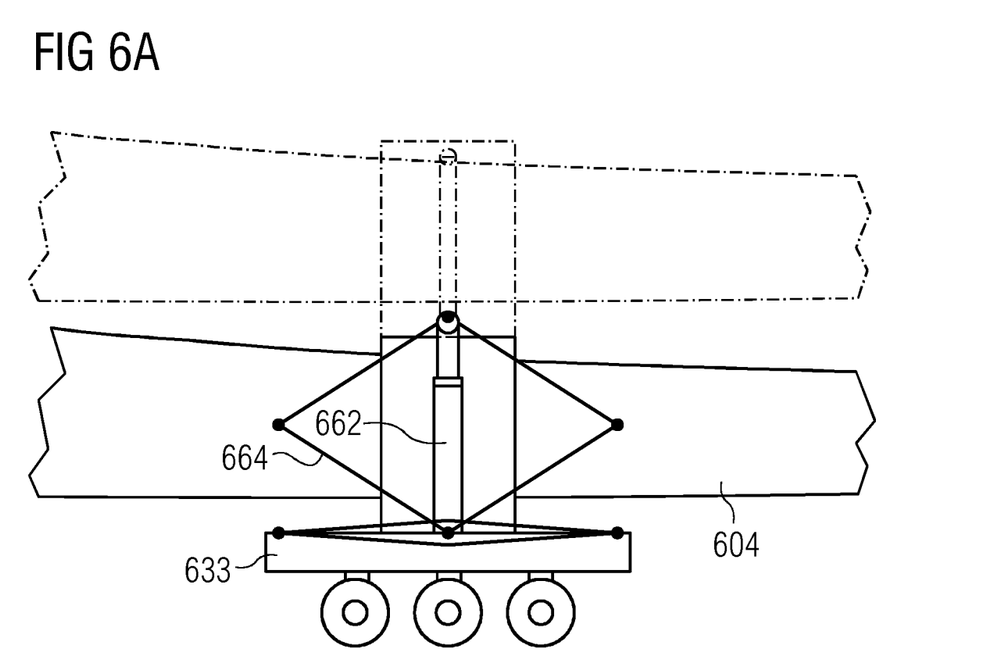
FIG. 6A shows a side view of a blade portion supported by a support arrangement according to an embodiment.

FIG. 6A shows a side view of a blade portion supported by a support arrangement according to an embodiment. More specifically, the portion of the blade 604 is supported on rear trailer 633 and elevated to the position indicated by the dashed line by operating the hydraulic cylinder 662 and scissor lift 664.

Figure 6B:
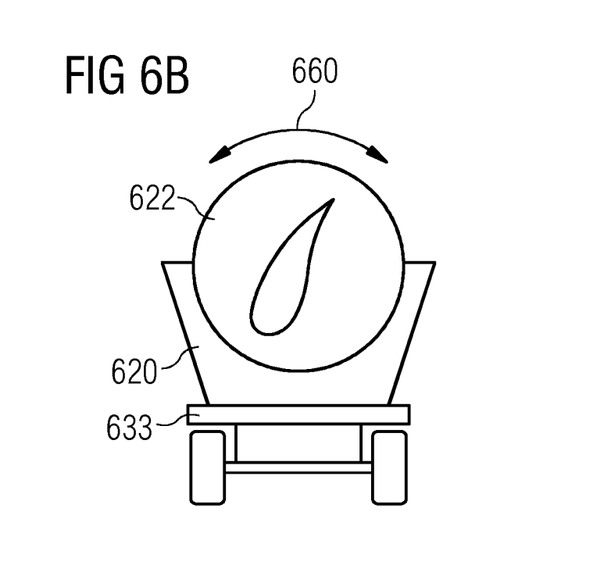
FIG. 6B shows a front view of the embodiment shown in FIG. 6A.

FIG. 6B shows a front view of the embodiment shown in FIG. 6A. More specifically, FIG. 6B shows the configuration where the support elevation element (not shown) is in its lowest position. The disc element 622 is arranged in the support cradle 620. When a rotational force is applied to the blade 604, the disc element 622 may slide within the support cradle 620 and allow the blade 604 to rotate as indicated by arrow 660.

Figure 7A:
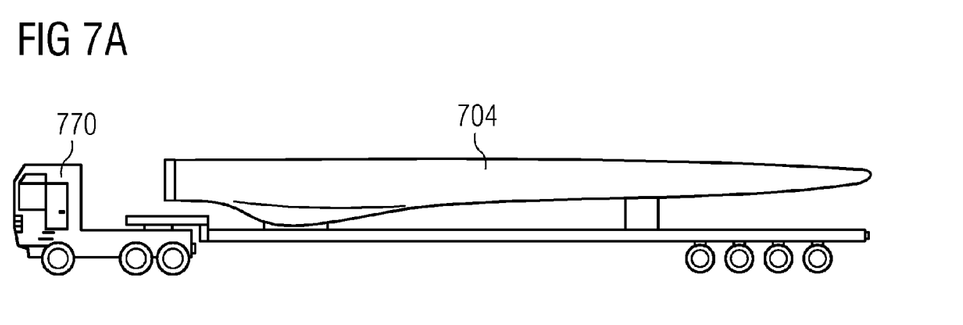
FIG. 7A shows a side view of a wind turbine blade transport vehicle according to an embodiment.

FIG. 7A shows a side view of a transport vehicle 770 carrying a wind turbine blade 704.

Figure 7B:
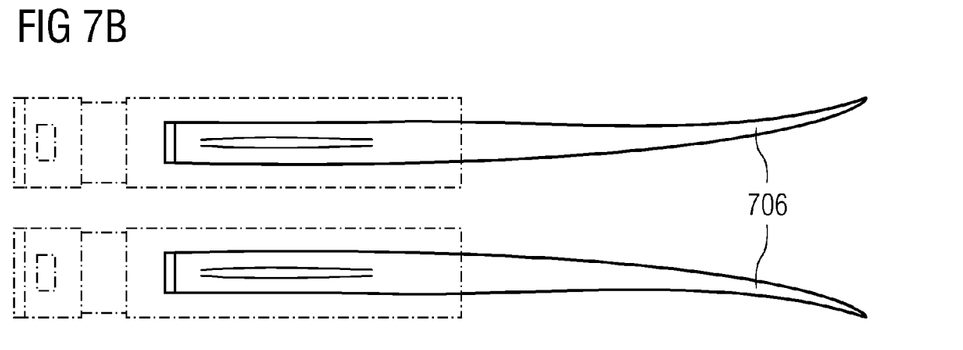
FIG. 7B shows two top views of the wind turbine blade transport vehicle shown in FIG. 7A.

FIG. 7B shows two top views of the wind turbine blade transport vehicle 770 shown in FIG. 7A. More specifically, the upper view of FIG. 7B shows a case where the blade 704 has been rotated such that a curved portion points to the right relative to the direction of driving (upwards in the drawing). This rotation may be beneficial when following a road turning right with a corresponding curvature. On the other hand, the lower view of FIG. 7B shows a case where the blade 704 has been rotated such that a curved portion points to the left relative to the direction of driving (downwards in the drawing). This rotation may be beneficial when following a road turning left with a corresponding curvature.

In general, it should be noted that the rotation and/or pivoting of the blade must be carried out with specific consideration to the circumstances. The main part of the transportation may take place with the blade tip pointing upwards such that the width of the transport is kept at a minimum. However, when facing particular obstacles, curved roads, roundabouts etc. as mentioned above, the transport may be stopped (or at least slowed down significantly) and the rotation and/or pivoting may be adjusted by one or more members of the transport crew. For the adjustment, the responsible crew members may rely on their experience and/or on information which has been previously stored in a computer system.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A system for supporting a blade for a wind turbine, in particular a wind turbine blade having a curved portion, the system comprising:
   a first support arrangement comprising:
      a root support element adapted to support a root portion of the blade such that the root portion is adjustably rotatable about a longitudinal axis of the blade, and
      a root elevation element adapted to adjust a vertical position of the entire root support element along a linear path, wherein the vertical position of the root support element is adjustable relative to a root support frame of the first support arrangement, wherein adjustable rotational and/or vertical positioning of the root portion of the blade respectively provided by the root support element and the root elevation element is effective to adjust blade position based on road varying geometry and/or obstacles encountered when the blade is transported along a road.

2. The system according to claim 1, wherein the root support frame is adapted to be detachably mounted at a platform of a transporting vehicle, wherein the root support element and the root elevation element are mounted at the root support frame.

3. The system according to claim 2, wherein the root support element and/or the root elevation element is/are pivotally mounted at the root support frame such as to be pivotal about an axis perpendicular to the longitudinal axis of at least a section of the blade, the at least one section including the root portion.

4. The system according to claim 1, wherein the root support element is adapted to rotate the root portion of the blade 360° around the longitudinal axis of the blade.

5. The system according to claim 1, wherein the root support element comprises at least one of a bearing, a toothed wheel, a toothed ring, and a motor/gear actuator.

6. The system according to claim 1, wherein the root elevation element includes a means for self-adjusting the vertical position.

7. The system according to claim 1, further comprising:
a second support arrangement for supporting a portion of the blade at a position along the blade, the second support arrangement comprising
a disc element adapted to circumferentially surround the blade at the position along the blade, and
a support cradle adapted to receive and support the disc element such that the disc element is rotatable within the support cradle when the root portion of the blade is rotated.

8. The system according to claim 7, wherein the disc element comprises an inner part made from a light-weight material and an outer part made from a low-friction material.

9. The system according to claim 7, wherein the support cradle is adapted to be detachably mounted at a platform of a transport vehicle.

10. The system according to claim 7, wherein the second support arrangement further comprises a support elevation element adapted to adjust a vertical position of the support cradle.

11. A transport vehicle for transporting a blade for a wind turbine, in particular a blade having a curved portion, the transport vehicle comprising:
a front platform,
a rear platform, and
a system according to claim 1,
wherein the first support arrangement is mounted at the front platform and a second support arrangement is mounted at the rear platform.

12. The transport vehicle according to claim 11, wherein a distance between the front platform and the rear platform is adjustable.

13. The system according to claim 6, wherein the means for self-adjusting the vertical position is selected from the group consisting of a hydraulic cylinder, a scissor lift a spindle drive, an actuator, a toothed bar, and a combination thereof.

14. The system according to claim 8, wherein the light-weight material comprises polystyrene material and the low-friction material comprises nylon material.

* * * * *